United States Patent
Ablow (10) Patent No.: US 12,136,106 B2
(45) Date of Patent: Nov. 5, 2024

(54) SYSTEM OF FUNDING FOR ADVERTISEMENTS AND METHOD OF USING THE SAME

(71) Applicant: Keith Ablow, Newburyport, MA (US)

(72) Inventor: Keith Ablow, Newburyport, MA (US)

(73) Assignee: Louder.ai, Inc., New York, NY (US)

( * ) Notice: Subject to any disclaimer, the term of this patent is extended or adjusted under 35 U.S.C. 154(b) by 0 days.

(21) Appl. No.: 17/324,994

(22) Filed: May 19, 2021

(65) Prior Publication Data

US 2022/0374940 A1 Nov. 24, 2022

(51) Int. Cl.
*G06Q 30/02* (2023.01)
*G06K 7/14* (2006.01)
*G06Q 30/0241* (2023.01)

(52) U.S. Cl.
CPC ....... *G06Q 30/0249* (2013.01); *G06K 7/1417* (2013.01)

(58) Field of Classification Search
CPC ....... G06Q 30/0207–30/0277; G06Q 30/0249; G06K 7/1417
See application file for complete search history.

(56) References Cited

U.S. PATENT DOCUMENTS

| | | | | |
|---|---|---|---|---|
| 6,092,052 | A * | 7/2000 | Ziarno | G06Q 20/20 705/16 |
| 7,627,483 | B2 * | 12/2009 | Miller | G06Q 30/0601 705/26.1 |
| 11,157,971 | B1 * | 10/2021 | Isgar | G06Q 20/102 |
| 2005/0004837 | A1 * | 1/2005 | Sweeney | G06Q 30/0239 705/14.27 |
| 2010/0010886 | A1 * | 1/2010 | Flynn, Jr. | G06Q 20/40 705/14.15 |
| 2013/0073336 | A1 * | 3/2013 | Heath | G06Q 30/02 705/7.29 |
| 2013/0151433 | A1 * | 6/2013 | Hicks | G06Q 30/0279 705/329 |
| 2013/0226688 | A1 * | 8/2013 | Harvilicz | G06Q 30/02 705/26.8 |
| 2014/0258086 | A1 * | 9/2014 | Bargagli | G06Q 40/025 705/38 |

(Continued)

*Primary Examiner* — Thuy N Nguyen
(74) *Attorney, Agent, or Firm* — Amber Marie Crum Whigham (57) ABSTRACT

A system and method for funding for communications, the system including instructions for displaying, using a processor connected to a network, a first communication associated with an interest, wherein the displaying of the first communication is on a user feed of a graphical user interface accessible by a user via a web browser or a mobile application; and displaying an icon positioned within or adjacent to the first communication on the user feed, that indicates the first communication is trumpetable and that the user can pay a monetary contribution to fund further propagation of the same. The processor registers a user input indicating a fixed amount of currency as the monetary contribution; performs a transfer of the currency from a user financial account to a second account designated to hold funds for the further propagation of the trumpetable communication; and projects the funded trumpetable communication to an advertising medium.

20 Claims, 4 Drawing Sheets

(56) References Cited

U.S. PATENT DOCUMENTS

| | | | |
|---|---|---|---|
| 2014/0317012 A1* | 10/2014 | Can | G06Q 30/0279 705/329 |
| 2015/0006426 A1* | 1/2015 | Sobhani | G06Q 30/0279 705/329 |
| 2015/0213523 A1* | 7/2015 | Tomich | G06Q 40/00 705/26.1 |
| 2015/0286836 A1* | 10/2015 | Menn | H04L 67/52 726/27 |
| 2015/0302366 A1* | 10/2015 | Khan | G06Q 20/10 705/42 |
| 2016/0005088 A1* | 1/2016 | Parkinson | G06F 16/9537 705/329 |
| 2016/0027072 A1* | 1/2016 | Dreicer | H04W 4/21 705/319 |
| 2016/0292754 A1* | 10/2016 | Lynch | G06Q 20/346 |
| 2017/0193572 A1* | 7/2017 | Rivera | G06Q 30/0279 |
| 2017/0265047 A1* | 9/2017 | Royer | H04W 4/12 |
| 2018/0018709 A1* | 1/2018 | Sela | H04M 3/2263 |
| 2018/0322543 A1* | 11/2018 | Graybill | G06Q 20/108 |
| 2018/0336602 A1* | 11/2018 | Glenn | G06Q 20/108 |
| 2020/0005363 A1* | 1/2020 | Terry | G06Q 30/0279 |
| 2020/0234380 A1* | 7/2020 | Dulori | G06Q 40/08 |
| 2021/0034693 A1* | 2/2021 | Semerad | G06F 16/986 |
| 2021/0042830 A1* | 2/2021 | Burke | G06Q 20/384 |
| 2021/0294287 A1* | 9/2021 | Valin | H02K 9/19 |
| 2022/0051302 A1* | 2/2022 | Wall | G06Q 30/0279 |

* cited by examiner

```
┌─────────────────────────────────────────────────────────────────────┐
│ Displaying a first communication associated with an interest or an  │
│ interested party on a user feed of a GUI accessible by a user via a │
│ web browser or a mobile app on a PED                                │
│                              110                                     │
└─────────────────────────────────────────────────────────────────────┘
```

```
┌─────────────────────────────────────────────────────────────────────┐
│ Displaying an icon within or adjacent to the first communication on │
│ the user feed which indicates the first communication is trumpetable│
│ and the user can pay a monetary contribution to fund further        │
│ propagation of the trumpetable communication                        │
│                              120                                     │
└─────────────────────────────────────────────────────────────────────┘
```

```
┌─────────────────────────────────────────────────────────────────────┐
│ Registering, in response to a user input on the PED, a selection by │
│ the user which indicates a fixed amount of currency as the monetary │
│ contribution                                                         │
│                              130                                     │
└─────────────────────────────────────────────────────────────────────┘
```

```
┌─────────────────────────────────────────────────────────────────────┐
│ Performing a transfer of the fixed amount of currency from a user   │
│ financial account to a second financial account designated to hold  │
│ funds for the further propagation of the trumpetable communication  │
│                              140                                     │
└─────────────────────────────────────────────────────────────────────┘
```

```
┌─────────────────────────────────────────────────────────────────────┐
│ Projecting the trumpetable communication funded by the user to an   │
│ advertising medium                                                   │
│                              150                                     │
└─────────────────────────────────────────────────────────────────────┘
```

```
┌─────────────────────────────────────────────────────────────────────┐
│ Tracking a response and engagement of the trumpeted communications  │
│ and tying performance to a user's contribution                      │
│                              160                                     │
└─────────────────────────────────────────────────────────────────────┘
```

SYSTEM OF FUNDING FOR ADVERTISEMENTS AND METHOD OF USING THE SAME

FIELD OF THE INVENTION

The present invention relates generally to a system for generating, sending, and receiving crowdfunding and directing funds to propagate designated advertisements and communications.

BACKGROUND

Many people and companies donate time and resources to support various interests, groups, projects, charitable events, causes, and campaigns. Various online platforms, social networking, and social media sites provide innovative ways for funding from online communities to promote community involvement and participation in these causes and campaigns. However, the donors are often largely unaware how their donations are being used by the recipients and whether the interests or causes are truly being furthered by their contribution.

Accordingly, there exists a need to provide a way for donors to contribute in a meaningful way to further their chosen causes and campaigns. That is, to provide a way for individual contributions and crowdfunding to be directed by the contributor(s) to fund a particular aspect of a cause or campaign—namely, advertising and spreading an associated message.

SUMMARY

An embodiment of this disclosure provides a method of funding for communications, including displaying, using a processor connected to a network, a first communication associated with at least one of an interest and an interested party, wherein the displaying of the first communication is on a user feed of a graphical user interface accessible by a receiving party via a web browser or a mobile application on a personal electronic device; and displaying, using the processor, an icon positioned within or adjacent to the first communication on the user feed, that indicates the first communication is a trumpetable communication and that the receiving party can pay a monetary contribution to fund further propagation of the trumpetable communication. The method further includes registering, using the processor and in response to a user input on a personal electronic device, a selection by the receiving party which indicates a fixed amount of currency as the monetary contribution; performing, using the processor connected to the network, a transfer of the fixed amount of currency from a first financial account associated with the receiving party to a second financial account designated to hold funds to fund the further propagation of the trumpetable communication; and projecting, via an advertising medium, the trumpetable communication funded by the receiving party.

In an embodiment of the above method, prior to providing the user input on the personal electronic device, the receiving party received the trumpetable communication via a first advertising medium and the processor registered an action by the receiving party to display the trumpetable communication on the user feed of the graphical user interface. In various embodiments, the action of the receiving party includes at least one of: selecting, via the personal electronic device, the icon displayed within or adjacent to the first communication on the graphical user interface; dialing a phone number using the personal electronic device; texting, using the personal electronic device, a code associated with the trumpetable communication to a number associated with the trumpetable communication; taking a picture of or scanning a QR code associated with the trumpetable communication using the personal electronic device; and enabling and receiving, via the personal electronic device, an electronic notification or beacon for the trumpetable communication.

In an embodiment of the disclosure, a system of funding for communications comprises a processor; a graphical user interface in communication with the processor; and at least one non-transitory program storage device in communication with the processor via a network, wherein the graphical user interface is accessible by a first party via a web browser or a mobile application on a personal electronic device, and the processor is configured to communicate with the at least one non-transitory program storage device and the graphical user interface to execute instructions. The instructions include displaying, on a user feed of the graphical user interface, a first communication associated with at least one of an interest and an interested party; and displaying, within or adjacent to the first communication on the user feed of the graphical user interface, an icon which indicates that the first communication is a trumpetable communication and that the first party can pay a monetary contribution to fund further propagation of the trumpetable communication. The instructions further include registering, in response to a user input on the personal electronic device, a selection by the first party which indicates a fixed amount of currency as the monetary contribution; performing a transfer of the fixed amount of currency from a first financial account associated with the first party to a second financial account designated to hold funds to fund the further propagation of the trumpetable communication; and projecting, via an advertising medium, the trumpetable communication funded by the first party.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the views. The particular objects and features of the instant disclosure as well as the advantages related hereto will become apparent from the following description taken in connection with the accompanying drawings, and wherein:

DETAILED DESCRIPTION

The following description of the embodiments of this disclosure is intended to enable someone skilled in the prior art to make and use that which is disclosed but is not intended to limit the claims to these particular exemplary embodiments.

In general, embodiments of the disclosure relate to a system for allowing donors to link a financial account of a user account that is accessible via a web browser or mobile application on a personal electronic device ("PED") and to directly fund the propagation of an advertisement or communication that is associated with a chosen cause, interest, or campaign.

In an embodiment, users, individuals, groups, or companies can interact with a PED which may include a device with a computer processor, a personal digital assistant ("PDA"), a laptop or desktop computer, a tablet, an iPad, a smart phone, a mobile phone, a camera, an electronic watch, a tablet, smart glasses, virtual reality (VR) goggles, VR headsets, and head-up displays, or a similar PED having network connectivity enabled therein. A head-up display being defined as any transparent display that presents data without requiring a user to look away from their usual viewpoints.

Figure 1:
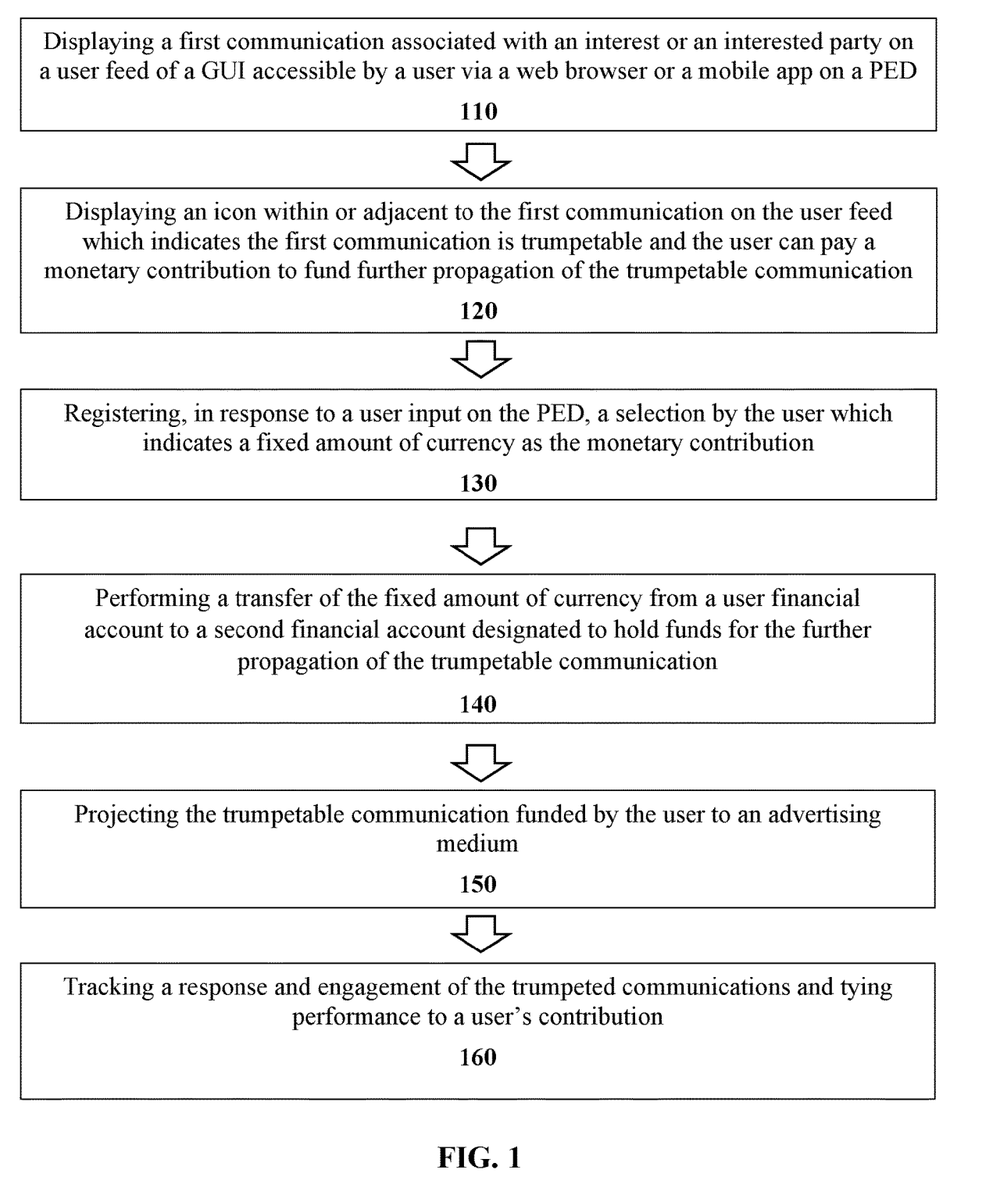
FIG. 1 is a flowchart illustrating a method of funding for advertisements according to an embodiment of the disclosure.

Referring now to FIG. 1, a block diagram illustrating a method according to an embodiment of the disclosure is illustrated. Each block diagram or operational illustrations, and combinations thereof, can be implemented by means of an analog or digital hardware and computer program instructions. These program instructions can be provided to a processor of a general purpose computer, special purpose computer, application-specific integrated circuit, or other programmable data processing apparatus, such that the instructions, which execute via the processor of the computer or other programmable electronic device, implements the operations/functions/acts/steps specified in the block diagrams, operation block(s), and/or alternate embodiments, the operations, functions, steps, and/or acts noted in the blocks may be implemented in a modified order, such as at least substantially concurrently, backwards, forwardly, or otherwise. The flowcharts illustrated herein are to provide a better understanding of the disclosure herein, but do not exclude other embodiments pertaining to an order of the same or embodiments comprising additional operations or such.

As illustrated in FIG. 1, an overview of an embodiment of the method is illustrated. The method begins with a processor displaying a communication on a user feed of a graphical user interface ("GUI") via a network (Operation 110). The user feed of the graphical user interface is accessible by a user via a web browser or a mobile application on a PED. As disclosed herein, a communication is associated with an interest or an interested party, such as a charity, charity event, cause, project, political campaign, marketing campaign, and/or an individual or group of people associated therewith. The cause or campaign can be associated with, for example, a human rights issue, a political party, a religious preference or affiliation, a personal opinion or stance on a public issue, a business-related cause, project, or marketing campaign, or a personal matter. In various embodiments, the communication can be any form of advertisement such as a posting, a notice, or an announcement promoting a product, a service, an event, an opinion, a religious affiliation, a political campaign ad, a meme, or any type of message that is intended to inform or influence people that receive the communication. The terms "communication" and "advertisement" are used interchangeably throughout this disclosure and are intended to include any and all types of messages as set forth herein and all other terms known by those of ordinary skill in the art as being included or related thereto. A communication can be a visual or audio communication or both.

The method of funding can further include the processor displaying an icon positioned within or adjacent to the first communication on the user feed, wherein the icon indicates that the first communication is a trumpetable communication and that the user can pay a monetary contribution to fund further propagation of the trumpetable communication (Operation 120). As used throughout the instant disclosure and as known by those of ordinary skill in the art, an icon or icon button is a little picture or image that can lead to an action when a user interacts with it through a user interface (e.g. clicking the icon with a mouse associated with a computer or laptop, or clicking the icon via a touchpad on a laptop). In an embodiment, the icon can simply include a picture with no text. In another embodiment, a button can be displayed within or near the communication rather than an icon, and the button can include text with or without an image. In some embodiments, the button may include text indicating an amount of a monetary contribution or currency. In other embodiments, the icon or button may include a QR code or any similar matrix barcode that allows for a camera or QR code reader application to identify and associate with a trumpetable communication.

As used throughout the disclosure, the term "trumpetable" is used to indicate that a communication or advertisement is capable of being further propagated by a user who provides a monetary contribution to fund the further propagation thereof. That is, a user seeing a communication displayed with the aforementioned icon will know that it is possible to pay money to further propagate the communication. If a user decides to support the cause or interest related to the communication by paying for others to receive the same message, the user then becomes a "trumpetor" and the user can "trumpet" the message or communication. The term "receiving party" is another name for user, person, or group that uses the disclosed system for trumpetable communications and is, or can become, a "trumpetor." The term "trumpet" is used throughout the disclosure and should be interpreted to mean "pay to further propagate."

The method further includes the processor registering, in response to a user input on a PED, a selection by the user which indicates a fixed amount of currency as a monetary contribution (Operation 130). A party seeing the trumpetable communication may choose to trumpet the communication by selecting or clicking the icon and further indicating a fixed amount of currency as the desired monetary contribution.

The next operation is the processor performing a transfer of the fixed amount of currency from a first financial account associated with the user to a second financial account designated to hold funds to fund the further propagation of the trumpetable communication (Operation 140). In an embodiment, the second financial account is dedicated to a group financial account for crowdfunding for the further propagation of the trumpetable communication.

After performing the transfer of funds from the user's financial account to another account, the method includes projecting, via an advertising medium, the trumpetable communication funded by the user (Operation 150). In some embodiments, the further propagation of the trumpetable communication may happen almost instantaneously with the transfer of funding; while in other embodiments of the disclosure, the projecting of the trumpetable communication funded by the user may happen at a different time or period of time.

An embodiment of the method of the disclosure may further include tracking a response and engagement of the trumpeted communications and tying performance to a user's contribution (Operation 160).

The advertising medium for the projecting of the trumpetable communication can include various ad channels. The ad channels include print media, digital billboards, terrestrial billboards, radio advertisements, TV advertisements, over-the-top (OTT) media services including media services directly to viewers via the internet, SMS campaigns enabling interaction with users via text, offline advertising media, digital advertising media, virtual advertising media, social networking, targeted emails, embedded video advertisements, and any other ad channels known by those of ordinary skill in the art.

In some embodiments, the user may have initially or previously received the trumpetable communication by one of these ad channels before it was displayed on the user feed of the graphical user interface. In an embodiment of the method disclosed herein, the processor may have transferred the trumpetable communication to an advertising medium for receipt by the user, and the processor may have registered an action by the user that caused the processor to display the trumpetable communication on the user feed. In various embodiments, the advertising medium where the receiving party received the trumpetable communication may be a different advertising medium than the advertising medium where the processor projects the trumpetable communication funded by the user. In an embodiment of the disclosure, the user may have received the trumpetable communication via an audio advertisement on the radio, and the processor may project the trumpetable communication funded by the user to a social network as an embedded video ad. In another embodiment of the disclosure, the user may have seen a trumpetable communication posted on a billboard sign next to a highway, and the system may project the trumpetable communication funded by the user as an advertisement distributed in the U.S. mail. The disclosure anticipates and includes countless embodiments including different combinations of ad channels for the distribution and receipt of the trumpetable communications.

As indicated above, the processor may register an action by the user that causes the processor to display the trumpetable communication on the user feed. The user's action could be any number of actions and in some embodiments, may depend, in part, on the ad channel where the user received the communication. In an embodiment, the user's action includes selecting, via a PED, the icon displayed within or adjacent to the first communication on the graphical user interface. In another embodiment of the disclosure, the user's action is dialing a phone number using a personal electronic device. In an embodiment, the user's action includes using a PED for texting a code associated with the trumpetable communication to a number associated with the trumpetable communication. In yet another embodiment, the action of the user includes taking a picture of or scanning a QR code associated with the trumpetable communication using a PED. In another embodiment, the action includes the user enabling and receiving, via a personal electronic device, an electronic notification or beacon for the trumpetable communication.

In an embodiment, the system may further include registering, using the processor and in response to a user input on a PED, a user selection of a range of currency as the monetary contribution, and registering a selection of a fixed amount of currency as the monetary contribution in response to a user selection of an advertising medium for the propagation of the trumpetable communication the user is funding. In an embodiment, the fixed amount of currency is within the range of currency the user selected. In another embodiment, the user is provided an opportunity to choose a different fixed amount of currency for the monetary contribution whether the fixed amount of currency is within the selected range of currency or not.

Various embodiments of the disclosure may include further operations such as associating on the graphical user interface, a user account with the user, wherein a user profile associated with the user account displays the trumpetable communication that the user is funding. An embodiment may further include linking the financial account of the user with the user account.

Another embodiment includes allowing a cause or interest to create a user account and allowing the cause to identify or designate a communication as being a trumpetable communication or as being a trumpetable communication only during a specified period of time. Thus, a user of the disclosed system may be a donor, citizen, group of citizens, company, group of companies, or the like; and a user may also be a cause or a party associated with the cause. A user account is created by the user and is utilized by the user to engage with the graphical user interface which encourages and permits users to interact with one another. This may include donors finding charities to selectively donate to, as well as charities or causes interacting with the donor users or with each other. In general, a user may engage in social activities whether they are a trumpetor, interested in becoming a trumpetor, and/or if they are associated with a trumpetable communication.

Figure 2:
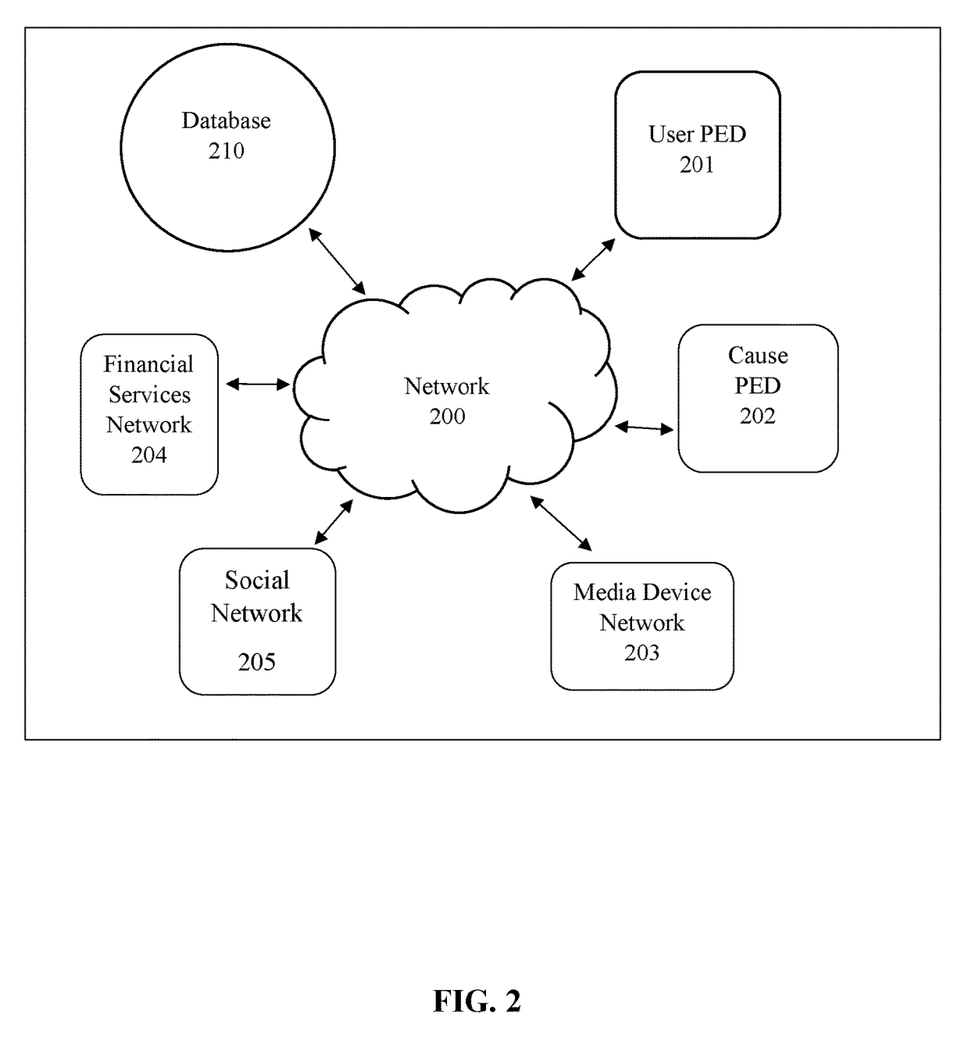
FIG. 2 is a block diagram illustrating a system of funding for advertisements according to an embodiment of the disclosure.

FIG. 2 illustrates a network configuration of an embodiment of the disclosure. Network 200 is in communication with a user PED 201, a cause user PED 202, a media device network 203, a financial services network 204, and a social network 205. Each device within the network may send and receive information. A database 210 may store information as well as send and receive information throughout the network 200.

Figure 3:
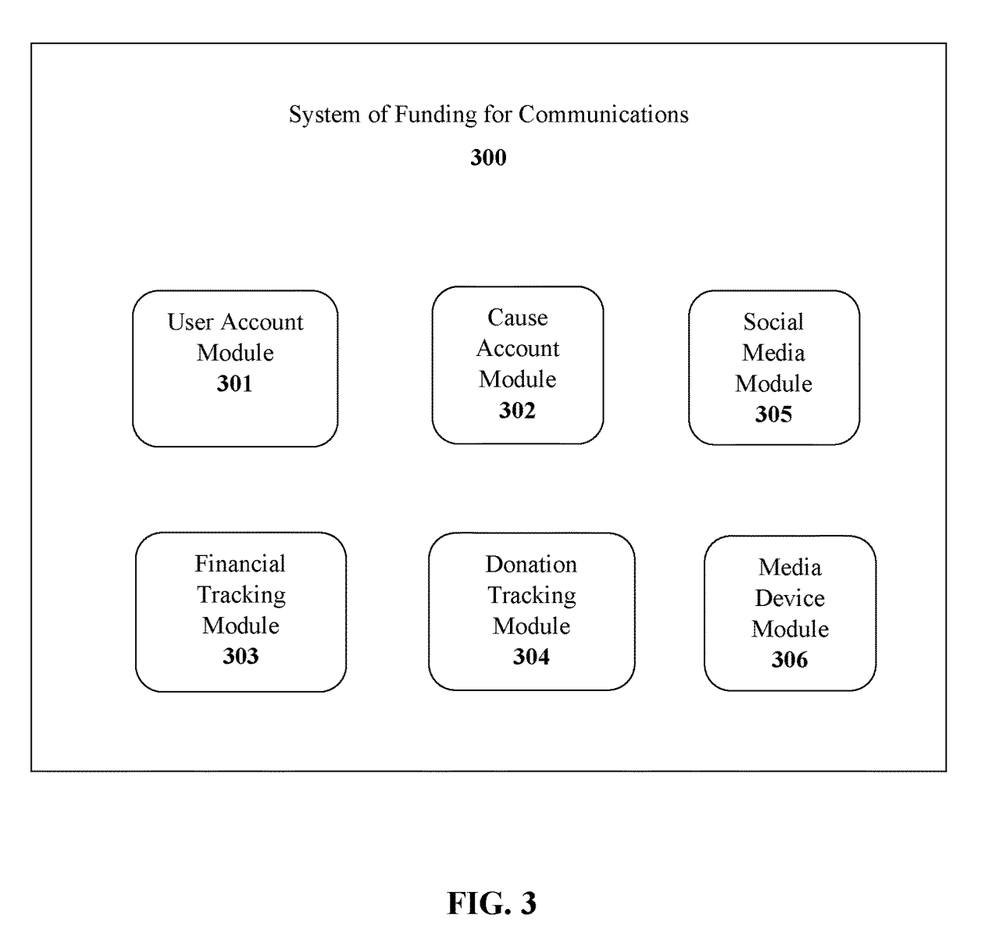
FIG. 3 is a block diagram illustrating a system of funding for advertisements according to an embodiment of the disclosure.

In an embodiment, the operations performed in FIG. 1 are performed by a plurality of modules, embodiments of which are illustrated in FIG. 3. The funding for advertisements system 300, in an embodiment, includes a user account module 301, a cause account module 302, a financial tracking module 303, a donation tracking module 304, a social media module 305, and a media device module 306, all of which communicate with one or more processors in order to execute functionalities and features of the disclosure.

In an embodiment, the user account module 301 and the cause account module 302 communicate with the user's PED 201 allowing for registration, donations, social networking, and other functionalities associated with the system 300. The financial tracking module 303 communicates with the financial network and receives transaction data regarding user transactions. The donation tracking module 304 identifies the cause and the particular trumpetable communication which the donation is directed towards and associates the appropriate cause and trumpetable communication with the appropriate user that donated the funds.

The system promotes user to user interactions as a means of promoting user participation throughout the network. Whether the user is a donor or whether the user is a cause or interested party associated with the cause, user profiles are viewable throughout the network as determined by user privacy settings standard in the arts.

To access and begin utilizing the network, a registration engine may be utilized to create an account. Once activated, the user may use their PED to access the graphical user interface by inputting credentials including a username, password, or similar implements. Once credentials are validated, any number of selectable panels, or graphical displays may be illustrated, each having specific account information related to the user, or other users in the network.

Figure 4:
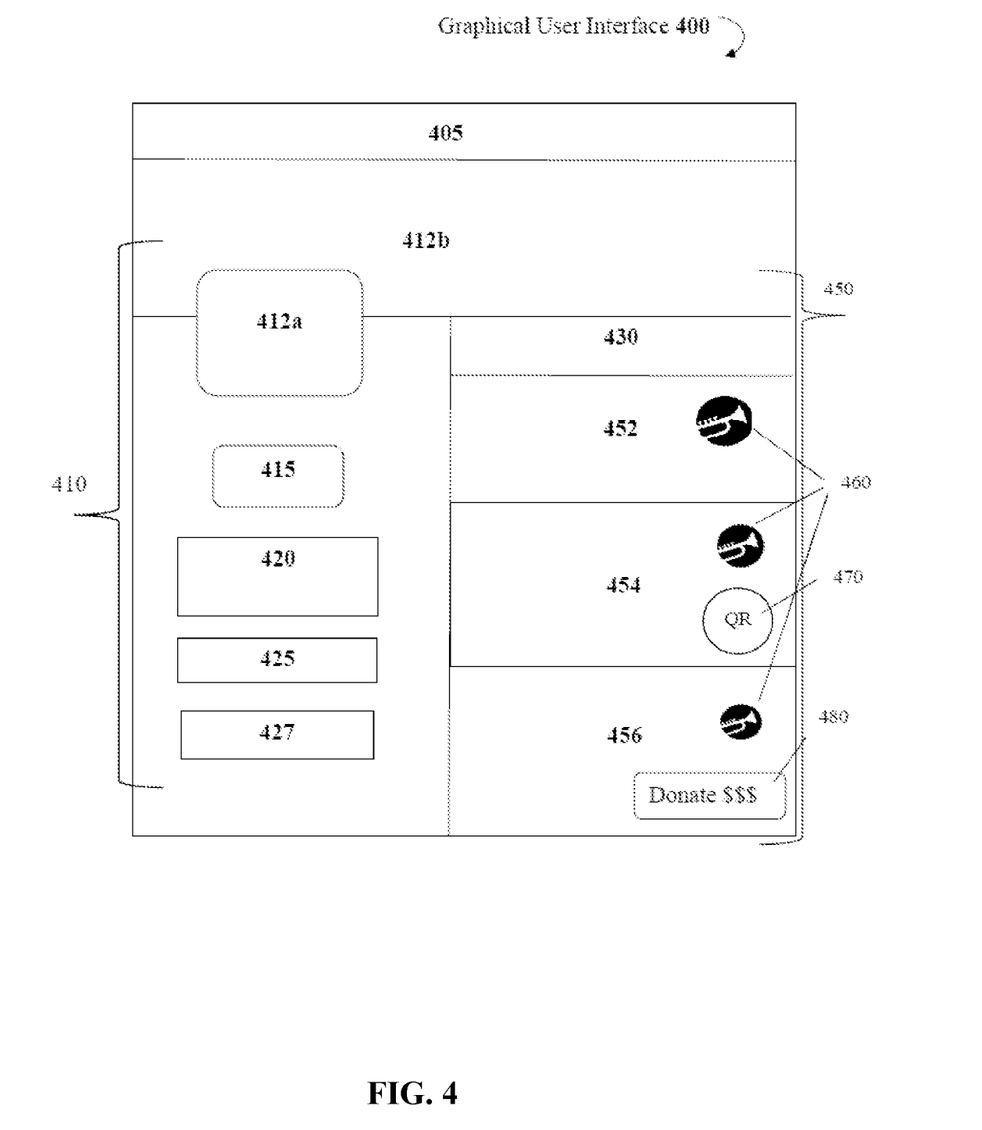
FIG. 4 is a block diagram illustrating a graphical user interface ("GUI") according to an embodiment of the disclosure.

FIG. 4 illustrates an embodiment of a graphical user interface ("GUI") 400. GUI 400 includes a user profile 410 including various user information such as user photos 412a and 412b, user information 415, a list or showing of the trumpetable communications that the user has funded 420, a total amount of contributions the user has made toward trumpetable communications 425, and a total number of impressions made upon other users who interacted with a same trumpetable communication as the user funded 427. Various embodiments of a GUI may include various user information and the items shown in FIG. 4 are merely exemplary. The user information 415 may include user contact information, core values, education details or college degrees, groups, or any other information that the user may wish to share publicly. The types of user information may be similar to those found in social networking profiles or other profiles associated with social or professional organizations and their networks.

GUI 400 further includes an information tool bar 405 which may include links to various pages or places in the GUI and can provide information about the part of the GUI which a user is currently viewing.

FIG. 4 also shows a user feed 450 which allows for the user to post and view various posted information and new trumpetable communications. User feed 450 includes a posting tool 430 which allows for a user to post new information to the network and allows the user to see postings from other users. The user feed 450 includes new or recently posted trumpetable communications such as Cause-A trumpetable communication 452, Cause-B trumpetable communication 454, and Cause-C trumpetable communication 456. Icon 460 is displayed within or adjacent to each of these trumpetable communications. Also shown within or adjacent to Cause-B trumpetable communication is QR code 470. Cause-C trumpetable communication is displayed with an associated donation button 480.

In an embodiment, the system may include instructions for allowing, via the user profile, the user to send personal messages back and further between one or more users on the network, wherein these personal messages are only viewable by the users involved. In an embodiment, the system includes instructions for allowing one user to "follow" another user and to be notified when the user makes any monetary contributions, as per the privacy settings of users involved.

In an embodiment, the system includes allowing, via the user profile, the user to customize at least one parameter of the trumpetable communication to create a customized trumpetable communication that the user can fund for propagation. Another embodiment includes allowing, via the user profile, the user to designate a userID that will be included on or near the trumpetable communication when it is further propagated using the user's monetary contribution, wherein the userID identifies the user or the user's account.

An embodiment of the disclosure includes displaying, on the user profile, an indication of a total amount of impressions made upon other users who interacted with the user's trumpetable communication. In another embodiment, the system may include displaying, on the user profile, a list of other users who have further funded the same trumpetable communication the user funded.

An embodiment of the disclosure includes providing the user with an opportunity to forward a posting or announcement about the monetary contribution to the user's contacts via social networks, to other user accounts in the disclosed system, and to a user's contacts in a personal network such as contacts in a phone. In an embodiment, the funding system disclosed herein may automatically, with user permission, post a message or other notification regarding the transaction via a social network or other designated network. Another embodiment may allow a user to notify other users as to a monetary contribution that was made for a same or similar trumpetable communication.

Additional embodiments of the disclosure may include a system with instructions for displaying on the user profile, a plurality of ad channels that may be utilized for the further propagation of the trumpetable communication. In an embodiment, the user may be allowed to choose the advertising medium from the plurality of ad channels for the trumpetable communication the user funds.

In an embodiment, the system may display, on the user profile of the user, a listing of various trumpetable communications associated with a same cause as that of the trumpetable communication the user funded or has funded in the past.

In various embodiments of the disclosure, the system may be gamified and the fixed amount of currency for the monetary contribution can be in the form of money, tokens, digital currency, and cryptocurrency. In various embodiments, the gamified system may allow a user to compete with one or more other users for a highest number of trumpetable communications funded. In an embodiment, the gamified system may allow a user to compete with other users based on a total amount of impressions made upon other users who interacted with the user's trumpetable communication.

In another embodiment, the gamified system may enable a user to become a host for a period of time and host a system event. In an embodiment, a hosting user may be enabled to decide how the users can compete with other users regarding a criteria associated with one or more trumpetable communications. The criteria may be a total number of trumpetable communications, a total amount of funding provided toward one or more trumpetable communications, a number of impressions made upon other users who interacted with the user's trumpetable communication, or any other criteria known to those of ordinary skill in the art.

In an embodiment of the gamified system, a user may be able to receive money or tokens or some other kind of tangible or virtual compensation as a result of participating in or hosting a gamified event with other users on the network. In an embodiment, the user may be able to put a user reward toward a further propagation of a chosen trumpetable communication instead of accepting a tangible or virtual compensation.

Different examples and aspects of the systems and methods are disclosed herein that include a variety of components, features, and functionality. It should be understood that the various examples and aspects of the systems and methods disclosed herein may include any of the components, features, and functionality of any of the other examples and aspects of the systems and methods disclosed herein in any combination, and all of such possibilities are intended to be within the spirit and scope of the present disclosure.

Many modifications and other examples of the disclosure set forth herein will come to mind to one of ordinary skill in the art to which the disclosure pertains having the benefit of the teachings presented in the foregoing descriptions and the associated drawings.

What is claimed is:

1. A method of funding for communications, comprising:
displaying, using a processor connected to a network, a first communication associated with at least one interest or interested party, wherein the displaying of the first communication is on a user feed of a graphical user interface accessible by a receiving party via a web browser or a mobile application on a personal electronic device, and wherein the first communication is a fundable communication;
displaying, using the processor, an icon or icon button positioned within or adjacent to the first communication on the user feed, wherein the icon or icon button includes a matrix barcode or a hyperlink;
identifying, using the personal electronic device, the matrix barcode or hyperlink, and displaying a donation screen associated with the matrix barcode or hyperlink and the fundable communication;
registering, using the processor and in response to a user input on the personal electronic device, a selection by the receiving party to initiate a transfer of a fixed amount of currency as a monetary contribution to fund the further propagation of the fundable communication;
performing, using the processor connected to the network, a transfer of the fixed amount of currency from a first financial account associated with the receiving party to a second financial account associated with a third party;
holding, using the processor connected to the network, funds in the second financial account associated with the third party;
transferring, using the processor connected to the network, the funds from the second financial account associated with the third party to directly and exclusively fund further propagation of the fundable communication, wherein the second financial account is independent from and inaccessible to the at least one interest or interested party and the receiving party; and
projecting, via an advertising medium, the fundable communication funded by the receiving party.

2. The method of funding for communications as in claim 1, wherein the advertising medium for the projecting of the fundable communication funded by the receiving party is a second advertising medium, and the method further comprises:
transferring, using the processor connected to the network, the fundable communication associated with the interest or the interested party, to a first advertising medium for receipt by the receiving party and other receiving parties; and
registering, using the processor, an action by the receiving party to display the fundable communication on the user feed of the graphical user interface.

3. The method of funding for communications as in claim 2, wherein the action of the receiving party comprises at least one of:
selecting, via the personal electronic device, the icon button comprising the hyperlink and displayed within or adjacent to the first communication on the graphical user interface;
dialing a phone number using the personal electronic device;
texting, using the personal electronic device, a code associated with the fundable communication to a number associated with the fundable communication;
taking a picture of or scanning the matrix barcode associated with the fundable communication using the personal electronic device; and
enabling and receiving, via the personal electronic device, an electronic notification or beacon for the fundable communication.

4. The method of funding for communications as in claim 1, wherein the personal electronic device comprises at least one of a computer processor, a laptop or desktop computer, a tablet, a smart phone, a mobile phone, a camera, an electronic watch, smart glasses, virtual reality (VR) goggles, a VR headset, and a head-up display.

5. The method of funding for communications as in claim 1, wherein the second financial account is dedicated to a group financial account for crowdfunding for the further propagation of the fundable communication.

6. The method of funding for communications as in claim 1, further comprising:
associating on the graphical user interface, using the processor, a user account with the receiving party, wherein a user profile associated with the user account displays the fundable communication that the receiving party is funding; and
linking, using the processor attached to the network, the first financial account with the user account.

7. The method of funding for communication as in claim 6, further comprising:
displaying on the user profile, using the processor, a plurality of ad channels that may be utilized for the further propagation of the fundable communication; and
allowing, via the user profile, the receiving party the ability to choose the second advertising medium from the plurality of ad channels.

8. The method of funding for communications as in claim 7, wherein the plurality of ad channels comprises print media, digital billboards, terrestrial billboards, radio advertisements, TV advertisements, over-the-top (OTT) media services including media services directly to viewers via the internet, SMS campaigns enabling interaction with users via text, offline advertising media, digital advertising media, virtual advertising media, social networking, targeted emails, and embedded video advertisements.

9. The method of funding for communications as in claim 6, further comprising at least one of:
allowing, via the user profile and using the processor, the receiving party to customize at least one parameter of the fundable communication to create a customized fundable communication that the receiving party can fund for propagation; and
allowing, via the user profile, using the processor, the receiving party to designate a userID that will be included on or near the fundable communication when it is further propagated using the receiving party's monetary contribution, wherein the userID identifies the receiving party or an account of the receiving party.

10. The method of funding for communications as in claim 6, further comprising at least one of:
displaying, on the user profile, an indication of a total amount of impressions made upon other users who interacted with the receiving party's fundable communication; and
displaying, on the user profile, a list of other users who have further funded the same fundable communication the receiving party funded.

11. The method of funding for communications as in claim 6, further comprising:

providing the receiving party with an opportunity to forward a posting or announcement about the monetary contribution to update at least one of other user accounts, contacts via social networks, or contacts in a personal network.

12. The method of funding for communications as in claim 1, wherein the interest is one of a political campaign, charity, business interest, and personal interest.

13. The method of funding for communications as in claim 1, wherein the method is gamified and the fixed amount of currency for the monetary contribution can be in the form of money, tokens, digital currency, and cryptocurrency.

14. A system of funding for communications, the system comprising:
   a processor;
   a graphical user interface in communication with the processor; and
   at least one non-transitory program storage device in communication with the processor via a network,
   wherein the graphical user interface is accessible by a first party via a web browser or a mobile application on a personal electronic device, and
   wherein the processor is configured to communicate with the at least one non-transitory program storage device and the graphical user interface to execute instructions for:
   displaying, on a user feed of the graphical user interface, a first communication associated with at least one interest or interested party, wherein the first communication is a fundable communication;
   displaying, within or adjacent to the first communication on the user feed of the graphical user interface, an icon or icon button including a matrix barcode or a hyperlink;
   identifying the matrix barcode or hyperlink, and displaying a donation screen associated with the matrix barcode or hyperlink and the fundable communication;
   registering, in response to a user input on the personal electronic device, a selection by the first party to initiate a transfer of a fixed amount of currency as a monetary contribution to fund the further propagation of the fundable communication;
   performing a transfer of the fixed amount of currency from a first financial account associated with the first party to a second financial account associated with a third party:
   holding funds in the second financial account associated with the third party;
   transferring the funds from the second financial account associated with the third party to directly and exclusively fund further propagation of the fundable communication, wherein the second financial account is independent from and inaccessible to the at least one interest or interested party and the receiving party; and
   projecting, via an advertising medium, the fundable communication funded by the first party.

15. The system of funding for communications as in claim 14, wherein the advertising medium for the projecting of the fundable communication funded by the first party is a second advertising medium, and the instructions further comprise:
   transferring, the fundable communication associated with the interest or the interested party, to a first advertising medium for receipt by the first party and other parties; and
   registering an action by the first party to display the fundable communication on the user feed of the graphical user interface.

16. The system of funding for communications as in claim 15, wherein the action of the first party comprises at least one of:
   selecting the icon button comprising the hyperlink and displayed within or adjacent to the first communication on the graphical user interface;
   dialing a phone number using the personal electronic device;
   texting, using the personal electronic device, a code associated with the fundable communication to a number associated with the fundable communication;
   taking a picture of or scanning the matrix barcode associated with the fundable communication using; and
   enabling and receiving, an electronic notification or beacon for the fundable communication.

17. The system of funding for communications as in claim 15, wherein the instructions further comprise:
   associating, on the graphical user interface, a user account with the first party, wherein a user profile associated with the user account displays the fundable communication that the first party is funding;
   displaying, on the user profile, a plurality of ad channels that may be utilized for the further propagation of the fundable communication; and
   allowing, via the user profile, the first party the ability to choose the second advertising medium from the plurality of ad channels.

18. The system of funding for communications as in claim 17, wherein the plurality of ad channels comprises print media, digital billboards, terrestrial billboards, radio advertisements, TV advertisements, OTT media services including media services directly to viewers via the internet, SMS campaigns enabling interaction with users via text, offline advertising media, digital advertising media, virtual advertising media, social networking, targeted emails, and embedded video advertisements.

19. The system of funding for communications as in claim 15, wherein the second financial account is dedicated to a group financial account for crowdfunding for the further propagation of the fundable communication.

20. A method of funding for communications, comprising:
   displaying, using a processor connected to a network, a first communication associated with at least one interest or interested party, wherein the displaying of the first communication is on a user feed of a graphical user interface accessible by a receiving party via a web browser or a mobile application on a personal electronic device, and wherein the first communication is a fundable communication;
   displaying, using the processor, an icon or icon button positioned within or adjacent to the first communication on the user feed, wherein the icon or icon button includes a matrix barcode or a hyperlink;
   identifying, using the personal electronic device, the matrix barcode or hyperlink, and displaying a donation screen associated with the matrix barcode or hyperlink and the fundable communication;
   registering, using the processor and in response to a user input on the personal electronic device, a selection by the receiving party to initiate a transfer of the fixed amount of currency as a monetary contribution to fund the further propagation of the fundable communication;

performing, using the processor, a transfer of the fixed amount of currency from a first financial account associated with the receiving party to a second financial account associated with a third party;

holding, using the processor connected to the network, funds in the second financial account associated with the third party;

transferring, using the processor connected to the network, the funds from the second financial account associated with the third party to directly and exclusively fund further propagation of the fundable communication, wherein the second financial account is independent from and inaccessible to the at least one interest or interested party and the receiving party; and projecting, via at least one advertising medium, the fundable communication funded by the receiving party, wherein prior to providing the user input on the personal electronic device, the receiving party received the fundable communication via a first advertising medium and the processor registered an action by the receiving party to display the fundable communication on the user feed of the graphical user interface, and wherein the action of the receiving party comprises at least one of:
- selecting, via the personal electronic device, the icon button comprising the hyperlink and displayed within or adjacent to the first communication on the graphical user interface;
- dialing a phone number using the personal electronic device;
- texting, using the personal electronic device, a code associated with the fundable communication to a number associated with the fundable communication;
- taking a picture of or scanning the matrix barcode associated with the fundable communication using the personal electronic device; and
- enabling and receiving, via the personal electronic device, an electronic notification or beacon for the fundable communication.

* * * * *